United States Patent
Rios et al.

(10) Patent No.: US 10,694,590 B2
(45) Date of Patent: Jun. 23, 2020

(54) ELECTROMAGNETIC PRINT NOZZLE FOR DIRECT-WRITE ADDITIVE MANUFACTURING

(71) Applicant: UT-BATTELLE, LLC, Oak Ridge, TN (US)

(72) Inventors: Orlando Rios, Knoxville, TN (US); William G. Carter, Oak Ridge, TN (US); Zachary C. Sims, Johnson City, TN (US); Lonnie J. Love, Knoxville, TN (US); Phillip C. Chesser, Knoxville, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 396 days.

(21) Appl. No.: 15/484,913

(22) Filed: Apr. 11, 2017

(65) Prior Publication Data

US 2018/0027615 A1    Jan. 25, 2018

Related U.S. Application Data

(60) Provisional application No. 62/364,934, filed on Jul. 21, 2016.

(51) Int. Cl.
*B23K 13/01* (2006.01)
*H05B 6/10* (2006.01)
(Continued)

(52) U.S. Cl.
CPC ............ *H05B 6/101* (2013.01); *B21C 23/005* (2013.01); *B21C 29/04* (2013.01); *B22F 3/1055* (2013.01);
(Continued)

(58) Field of Classification Search
CPC ... B29C 64/106; B29C 64/118; B29C 64/209; B29C 64/336; B33Y 10/00; B33Y 50/02; B33Y 30/00; H05B 6/06; H05B 6/101; H05B 6/14; H05B 6/36; H05B 6/40; B21C 29/04; B21C 23/005; B23K 13/01;
(Continued)

(56) References Cited

U.S. PATENT DOCUMENTS

| | | |
|---|---|---|
| 5,340,433 A | 8/1994 | Crump |
| 5,738,817 A | 4/1998 | Danforth et al. |

(Continued)

FOREIGN PATENT DOCUMENTS

| | | |
|---|---|---|
| CN | 103876263 A | 6/2014 |
| CN | 104453227 | 3/2015 |

(Continued)

OTHER PUBLICATIONS

PCT International Search Report from PCT/US2017/039768, Form PCT/ISA/210, dated Sep. 28, 2017, (5 pages).

(Continued)

*Primary Examiner* — Hung D Nguyen
(74) *Attorney, Agent, or Firm* — Pauley Erickson & Kottis

(57) ABSTRACT

A method and apparatus for additive manufacturing that includes a material guide for directing a supply of working material and a plurality of rollers for advancing the working material. An electromagnetic heater is provided to heat and deposit molten working material as a new supply of working material is forced through the material guide.

17 Claims, 19 Drawing Sheets

(51) Int. Cl.
| | |
|---|---|
| *B29C 64/118* | (2017.01) |
| *B29C 64/336* | (2017.01) |
| *B22F 3/105* | (2006.01) |
| *B29C 64/209* | (2017.01) |
| *B22F 3/115* | (2006.01) |
| *B29C 64/106* | (2017.01) |
| *B33Y 10/00* | (2015.01) |
| *B33Y 30/00* | (2015.01) |
| *B33Y 50/02* | (2015.01) |
| *H05B 6/06* | (2006.01) |
| *H05B 6/40* | (2006.01) |
| *H05B 6/36* | (2006.01) |
| *B21C 23/00* | (2006.01) |
| *B21C 29/04* | (2006.01) |
| *B23K 13/04* | (2006.01) |
| *H05B 6/14* | (2006.01) |
| *B23K 103/10* | (2006.01) |
| *B29K 105/00* | (2006.01) |
| *B29K 105/16* | (2006.01) |

(52) U.S. Cl.
CPC .............. *B22F 3/115* (2013.01); *B23K 13/01* (2013.01); *B23K 13/04* (2013.01); *B29C 64/106* (2017.08); *B29C 64/118* (2017.08); *B29C 64/209* (2017.08); *B29C 64/336* (2017.08); *B33Y 10/00* (2014.12); *B33Y 30/00* (2014.12); *B33Y 50/02* (2014.12); *H05B 6/06* (2013.01); *H05B 6/14* (2013.01); *H05B 6/36* (2013.01); *H05B 6/40* (2013.01); *B22F 2003/1056* (2013.01); *B22F 2202/07* (2013.01); *B22F 2999/00* (2013.01); *B23K 2103/10* (2018.08); *B29K 2105/0067* (2013.01); *B29K 2105/16* (2013.01); *Y02P 10/295* (2015.11)

(58) Field of Classification Search
CPC ................ B23K 13/04; B23K 2103/10; B29K 2105/0067; B29K 2105/16; B22F 2003/1056; B22F 2999/00; B22F 3/1055; B22F 3/115; B22F 2202/07; Y02P 10/295
USPC ....... 219/600, 603, 609, 614, 615, 616, 617, 219/635, 665, 667, 674; 264/129, 212, 264/241, 308, 435, 603
See application file for complete search history.

(56) References Cited

U.S. PATENT DOCUMENTS

| | | | |
|---|---|---|---|
| 2003/0029863 A1* | 2/2003 | Morrison | H05B 6/04 |
| | | | 219/628 |
| 2006/0109325 A1* | 5/2006 | Araya | B41J 11/0015 |
| | | | 347/101 |
| 2010/0327479 A1 | 12/2010 | Zinniel et al. | |
| 2012/0070523 A1 | 3/2012 | Swanson et al. | |
| 2015/0183164 A1 | 7/2015 | Duty et al. | |
| 2015/0189600 A1 | 7/2015 | Choi et al. | |
| 2015/0230912 A1 | 8/2015 | Lee et al. | |
| 2016/0009030 A1 | 1/2016 | Mark et al. | |
| 2016/0016369 A1 | 1/2016 | Tarbutton et al. | |
| 2016/0031159 A1 | 2/2016 | Church et al. | |
| 2016/0057814 A1* | 2/2016 | Klett | H05B 6/105 |
| | | | 219/643 |
| 2016/0075089 A1 | 3/2016 | Duro Royo et al. | |
| 2016/0151833 A1* | 6/2016 | Tsao | B23K 9/04 |
| | | | 264/308 |
| 2017/0190109 A1* | 7/2017 | Holland | B33Y 50/02 |

FOREIGN PATENT DOCUMENTS

| | | |
|---|---|---|
| CN | 204844875 U | 12/2015 |
| DE | 33 46 254 A1 | 7/1985 |
| EP | 3 042 751 A1 | 7/2016 |
| WO | WO 01/89814 A1 | 11/2001 |
| WO | WO 2015/189600 A2 | 12/2015 |

OTHER PUBLICATIONS

PCT Written Opinion of the International Searching Authority from PCT/US2017/039768, Form PCT/ISA/237, dated Sep. 28, 2017, (11 pages).
PCT International Search Report from PCT/US2017/039714, Form PCT/ISA/210, dated Sep. 28, 2017, (5 pages).
PCT Written Opinion of the International Searching Authority from PCT/US2017/039714, Form PCT/ISA/237, dated Sep. 28, 2017, (12 pages).
PCT International Search Report from PCT/US2017/039748, Form PCT/ISA/210, dated Sep. 28, 2017, (5 pages).
PCT Written Opinion of the International Searching Authority from PCT/US2017/039748, Form PCT/ISA/237, dated Sep. 28, 2017, (10 pages).
Co-pending U.S. Appl. No. 15/484,937, Orlando Rios et al., filed Apr. 11, 2017.
Co-pending U.S. Appl. No. 15/484,967, Orlando Rios et al., filed Apr. 11, 2017.
W.S. Tan, "Proof of concept: Application of induction heating to 3D print low melting point metal alloy.," Final Project Summary Report 2015, University of New South Wales at the Australian Defence Force Academy, pp. 1-13, 2015.

* cited by examiner

Melting rate of various materials vs the heat input to those materials

Heat input to various materials vs the melt rate of those materials

ELECTROMAGNETIC PRINT NOZZLE FOR DIRECT-WRITE ADDITIVE MANUFACTURING

CROSS REFERENCE TO RELATED APPLICATION

This application claims priority to U.S. Provisional Application, Ser. No. 62/364,934, filed on 21 Jul. 2016. This U.S. Provisional Application is hereby incorporated by reference herein in its entirety and are made a part hereof, including but not limited to those portions which specifically appear hereinafter.

GOVERNMENT RIGHTS

This invention was made with government support under Contract No. DE-AC05-00OR22725 awarded by the U.S. Department of Energy. The government has certain rights in the invention.

FIELD OF THE INVENTION

The present invention relates to an additive manufacturing nozzle and feed system.

BACKGROUND OF THE INVENTION

Additive manufacturing may be used to quickly and efficiently manufacture complex three-dimensional components layer-by-layer, effectively forming complex components. Such additive manufacturing may be accomplished using polymers, alloys, powders, wires, or similar feed stock materials that transition from a liquid or granular state to a cured, solid component.

Additive manufacturing is typically accomplished by several technologies that rely on feeding polymer materials through a nozzle that is precisely located over a preheated or unheated substrate. Parts are manufactured by the deposition of new layers of materials above the previously deposited layers. Unlike rapid prototyping processes, additive manufacturing is intended to produce a functional component constructed with materials that have strength and properties relevant to engineering applications. On the contrary, rapid prototyping processes typically produce exemplary models that are not production ready.

Heating of the feed or filler material in the nozzle in additive manufacturing is generally accomplished by direct contact between a polymer feed stock and a heating element, typically a resistively heated metal cylinder at elevated temperatures. Likewise, in additive manufacturing, unlike rapid prototyping, the entire component under construction is typically maintained at an elevated temperature in a chamber or furnace until the build is complete. Keeping previously deposited layers at elevated temperature improves the adhesion between the component and newly deposited material while minimizing macroscopic distortion. There are inherent limitations to this technology that prevent higher deposition rates, out of furnace printing and control of microstructural defects (such as pores).

In addition, existing additive manufacturing processes, including polymer extrusion based deposition for additive manufacturing (PeD), typically exhibit a thermal lag associated with heating a deposition nozzle. Typical PeD systems obtain thermal stability by maintaining a massive resistive heater at a constant temperature resulting in slow response. This makes accurate control of the flow difficult and prevents the building of advanced structures that require transient deposition rates and frequent interruptions in flow (in a mechanism analogous to image generation in an ink jet printer).

SUMMARY OF THE INVENTION

One motivation for the subject invention is to increase the supply and controllability of the flow of working material, both of which translate to increased build rates. This is accomplished, in part, by providing a generally continuous supply of working material and avoidance of pausing and restarting the system to load new working material. The subject invention enables control of deposition rates with a generally non-contact heating technology that can be used to quickly heat a low thermal mass deposition nozzle, materials within a deposition nozzle and/or locally heat specific locations of the build.

In addition, removal of joule heating will significantly separate the position dependent heat source from the extruder which impacts part quality. In this manner, a part may be manufactured in accordance with the invention in large scale applications and without reliance on an oven or controlled environment for the build. Further, this technology may be used as a means to apply targeted heating of the polymer material through the build or locally to active manufacturing surface locations.

A printing nozzle for use in deposition for additive manufacturing includes a refillable supply of a working material provided to a material guide. A plurality of rollers are positioned in lateral contact with outside edges of the working material for advancing the working material forward. An electromagnetic heating element positioned with respect to the material guide heats the working material where it is deposited on a workpiece through a tip in the material guide.

Other objects and advantages will be apparent to those skilled in the art from the following detailed description taken in conjunction with the appended claims and drawings.

DETAILED DESCRIPTION OF THE INVENTION

The present invention provides a non-contact heating technology that can be used to quickly heat materials within a deposition nozzle, locally heat specific locations of a deposition modeling build and/or uniformly heat the build outside of a furnace or similarly controlled environment. As a result, the weight and size of the liquefier is reduced and sensitivity and controllability of material flow is improved, resulting in increased build rates. According to a preferred embodiment, the subject method and apparatus employs high intensity electromagnetic energy, for instance, transient high flux alternating magnetic fields, to working materials resulting in a highly controllable additive manufacturing process.

In particular, the subject invention contemplates use of a direct metal write process involving the supply and deposition of molten metal onto a substrate or previously deposited material. This is in contrast to existing metal-based additive manufacturing processes where either a binder is deposited onto a bed of metal powder to temporarily bond it until sintering can occur or a laser or electron beam is used to melt or sinter a bed of metal powder.

Figure 1:
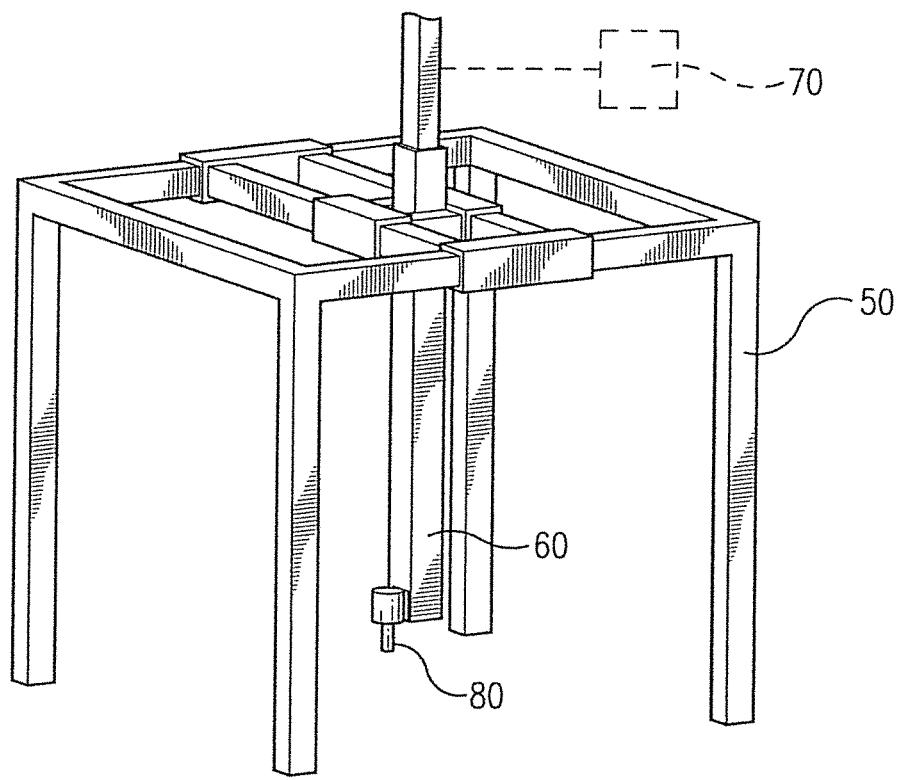
FIG. 1 is a schematic of a system according to one embodiment of this invention.

Although not required, the subject invention may be used in connection with large scale polymer added manufacturing such as the schematic shown in FIG. 1. FIG. 1 shows a frame or gantry 50 for containing a build. The gantry 50 preferably contains a deposition arm 60 that is moveable through the x, y and z-axis. The deposition arm 60 preferably accommodates a supply of working material and a deposition nozzle 80. The supply of working material may be onboard the deposition arm and/or remotely supplied from a hopper or similar storage vessel.

Figure 2:
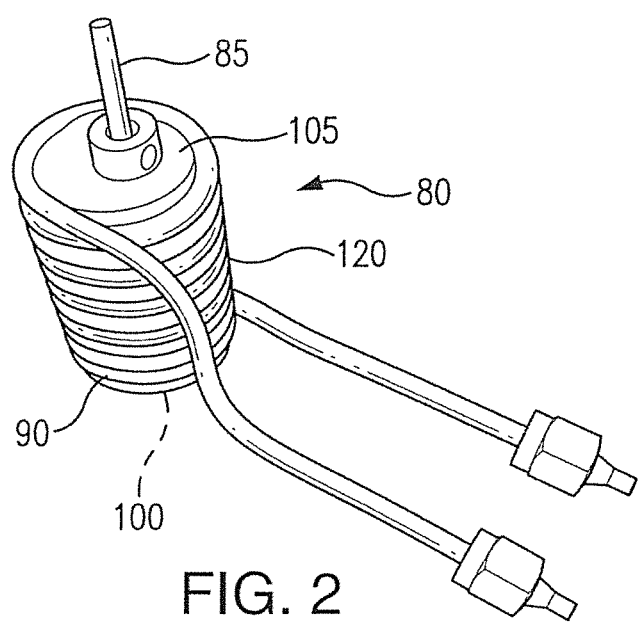
FIG. 2 is a perspective view of an electromagnetic nozzle according to one embodiment of this invention.

According to a preferred embodiment of the invention, a method of additive manufacturing includes the steps of providing an apparatus for additive manufacturing, for instance the gantry system shown in FIG. 1. The apparatus preferably includes a nozzle 80 for extruding a material, such as shown in FIG. 2. The nozzle 80 preferably operably contacts a working material as described in more detail below. FIG. 2 shows a preferred embodiment of the nozzle 80 including a material guide 85 through which the working material is provided, a plate 90 and a tip 100 from which the working material is directly deposited on the build. A coil 120 is preferably wrapped around the material guide and comprises an assembly that may further include a thermally conductive wrap around the material guide 85, for instance, boron nitride.

Schematics of various embodiments of a deposition nozzle 80 used in such systems are shown in FIG. 3-26. Accordingly, as shown in FIG. 2, a printing nozzle 80 and tip 100 includes a metallic material guide 85 for permitting a desired flow of material wherein the tip 100 is positioned at an end of the material guide 85 for depositing the material in an appropriate position in space. The material guide 85 may be constructed of aluminum or similar metallic material having the desired properties. Alternatively, the material guide 85 may comprise a ceramic or similar non-electrically conductive material that is transparent to electromagnetic energy. This alternative arrangement permits direct heating of the working material from the coil 120.

FIGS. 3-9 show embodiments of the nozzle wherein a, printing nozzle used for additive manufacturing includes a supply of a working material and a plurality of rollers 150 in lateral contact with outside edges of the working material for advancing the working material forward. As shown, a material guide 85 is sized to permit a desired flow of the working material and includes a tip 100 positioned at an end of the material guide 85 for depositing the working material in an appropriate position in space. The material guide may be constructed of boron nitride. Further, as shown and described, an electromagnetic heating element 110, such as an induction coil, is positioned with respect to the material guide 85.

Figure 3:
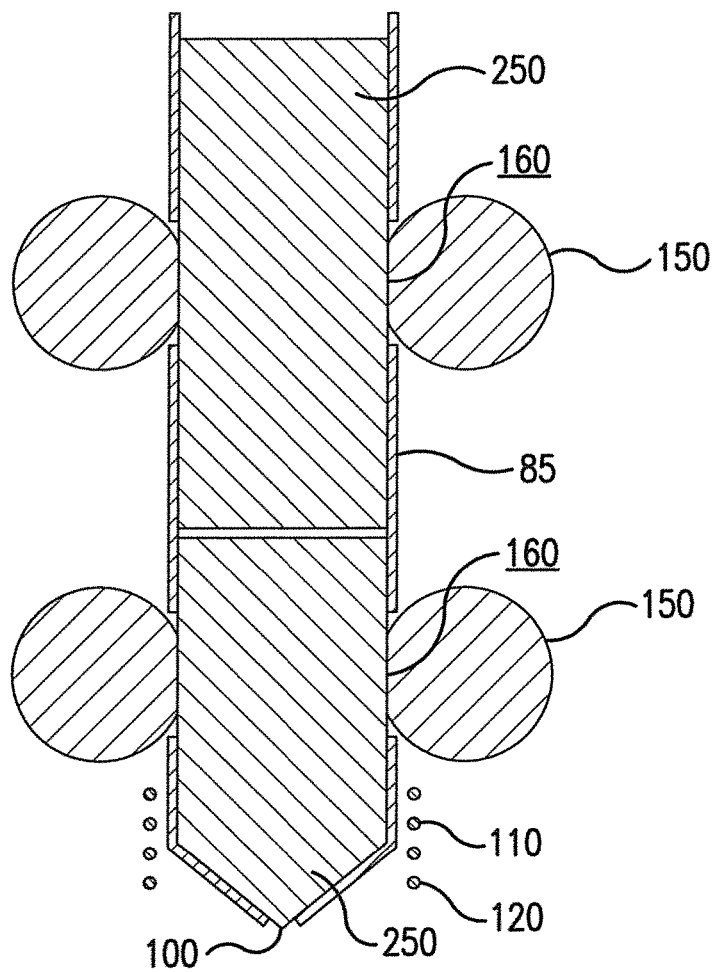
FIG. 3 is a schematic of an electromagnetic nozzle and an induction coil according to one embodiment of this invention.
Figure 4:
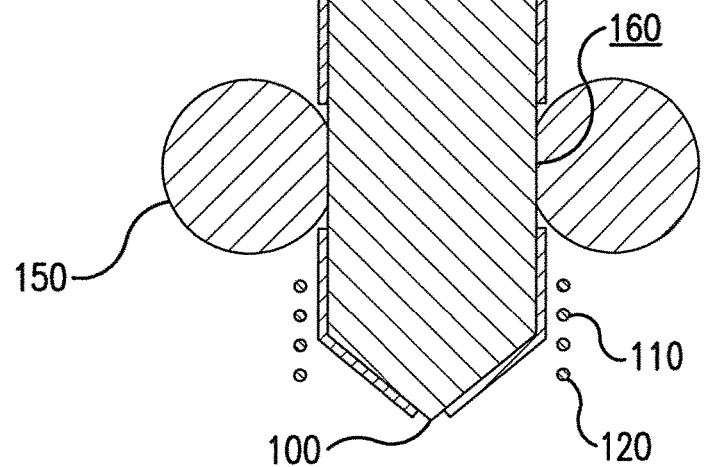
FIG. 4 is a schematic of an electromagnetic nozzle and an induction coil according to one embodiment of this invention.

According to embodiments shown in FIGS. 3-9, the rollers 150 positioned along the printing nozzle 80 may comprise one or more sets of gears or knurled outer surfaces. The printing nozzle as shown in FIGS. 3 and 4 may further include a plurality of channels 160 within the material guide 85 that correspond with one or more rollers 150 to permit direct contact between the build or working material and the rollers 150. The rollers 150 as described may be established at multiple positions along a length of the material guide 85 and function to direct the material into the nozzle.

The working material may comprise a polymer, such as a thermoplastic, a metal or other material suitable for additive manufacturing. Polymeric working materials may include thermoplastic materials, such as nylon, ABS or ULTEM™ resin, or a cross-linking thermoset, such as polyurethane or epoxy. Further, the working material may combined with a filler material to create a composite, either in process as described herein or prior.

Figure 8:
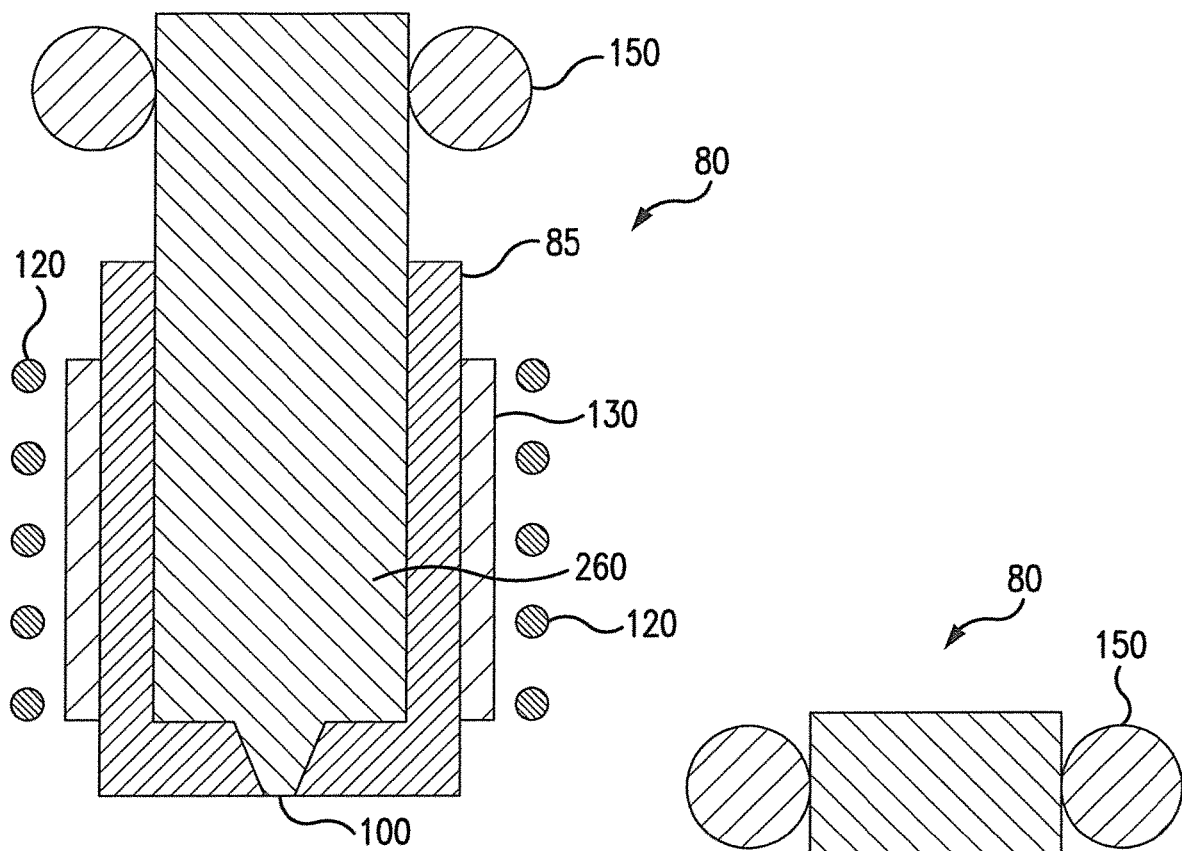
FIG. 8 is a schematic of an electromagnetic nozzle and an induction coil according to one embodiment of this invention.
Figure 9:
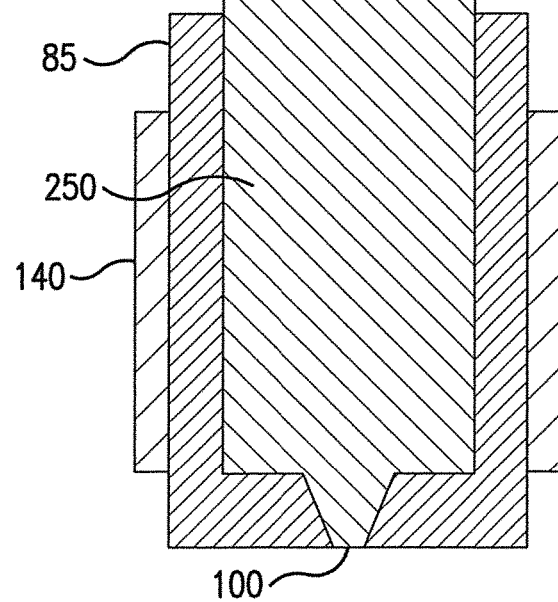
FIG. 9 is a schematic of an electromagnetic nozzle and a resistive heater according to one embodiment of this invention.

Such filler materials may include carbon fiber, fiberglass and/or electromagnetically susceptible microscale and/or nano particles. According to embodiments shown in FIGS. 3 and 4, the working material may be provided in slugs 250 that may be provided intermittently to the material guide 85, as shown in FIG. 3. Alternatively, or in addition, the working material may be provided in elongated and/or generally continuous filaments 260, as shown in FIGS. 4, 8 and 9. Such filaments may be elongated sections or rolled or otherwise spooled to enable extended deposition runs without pausing or restarting the process.

According to embodiments of the invention, the working material comprises a metal, such as aluminum. More specifically, the working material may comprise an aluminum alloy, including Alnico, or various other metals having electromagnetic susceptibility.

Figure 18:
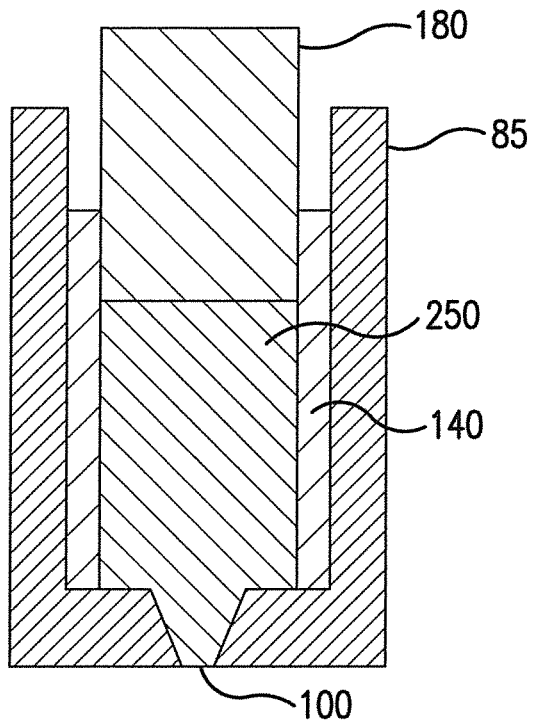
FIG. 18 is a schematic of an electromagnetic nozzle and a resistive heater according to one embodiment of this invention.
Figure 19:
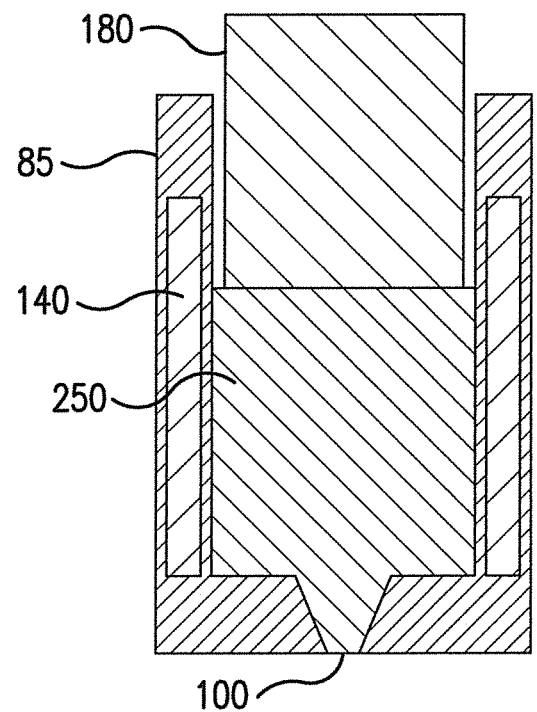
FIG. 19 is a schematic of an electromagnetic nozzle and a resistive heater according to one embodiment of this invention.

An electromagnetic heating element 110 is preferably positioned with respect to the tip 100 of the material guide 85. The electromagnetic heating element 110 may be an induction coil positioned around the tip 100, such as shown in FIGS. 3-4, 13, 24 and 26. Alternatively, the electromagnetic heating element 110 may be an induction coil positioned around the material guide 85, such as shown in FIGS. 10-12, 14-16 and 25. Still additionally, the electromagnetic heating element 110 may comprise a resistive heater and be embedded within the material guide, such as shown in FIGS. 18-19.

A method for additive manufacturing according to one embodiment of the invention includes providing a supply of a working material and advancing the working material forward with a plurality of rollers 150 in lateral contact with outside edges of the working material through the material guide 85. The working material is then heated in the material guide with an electromagnetic heating element positioned around the material guide and the molten working material is deposited through the tip 100 positioned at an end of the material guide 85 in an appropriate position in space.

Figure 5:
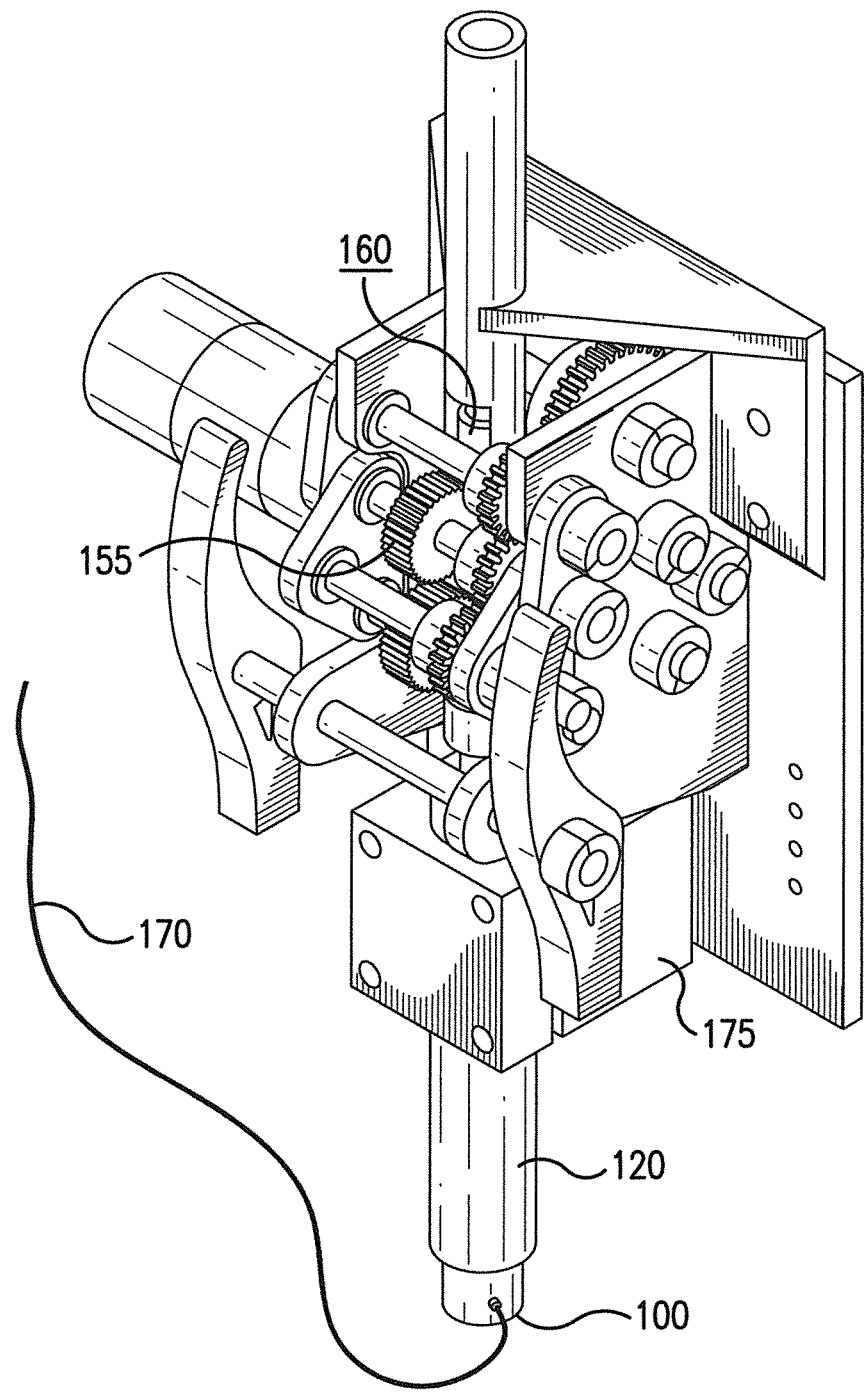
FIG. 5 is a perspective front view of an electromagnetic nozzle according to one embodiment of this invention.
Figure 6:
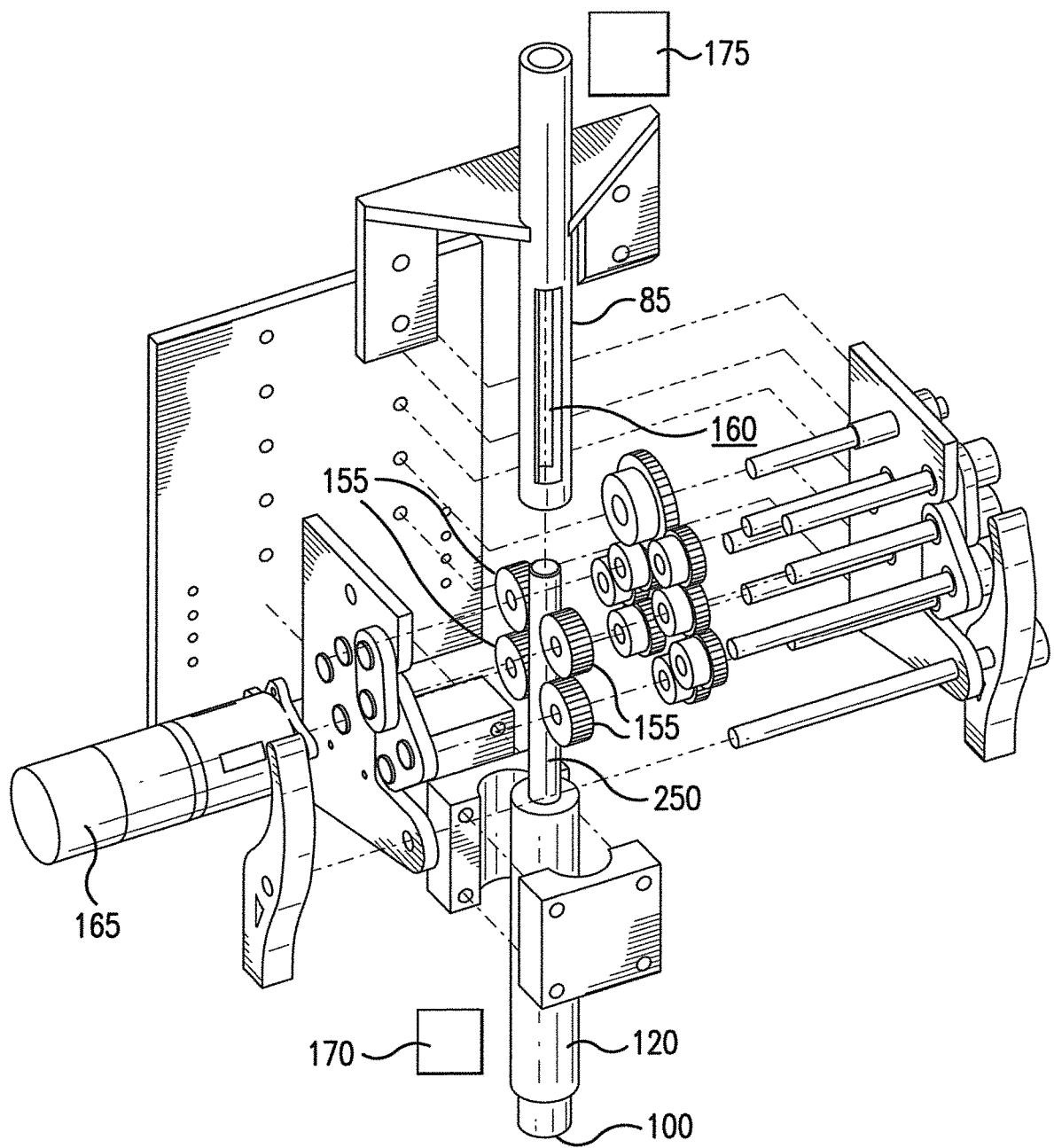
FIG. 6 is an exploded view of the electromagnetic nozzle shown in FIG. 5.
Figure 7:
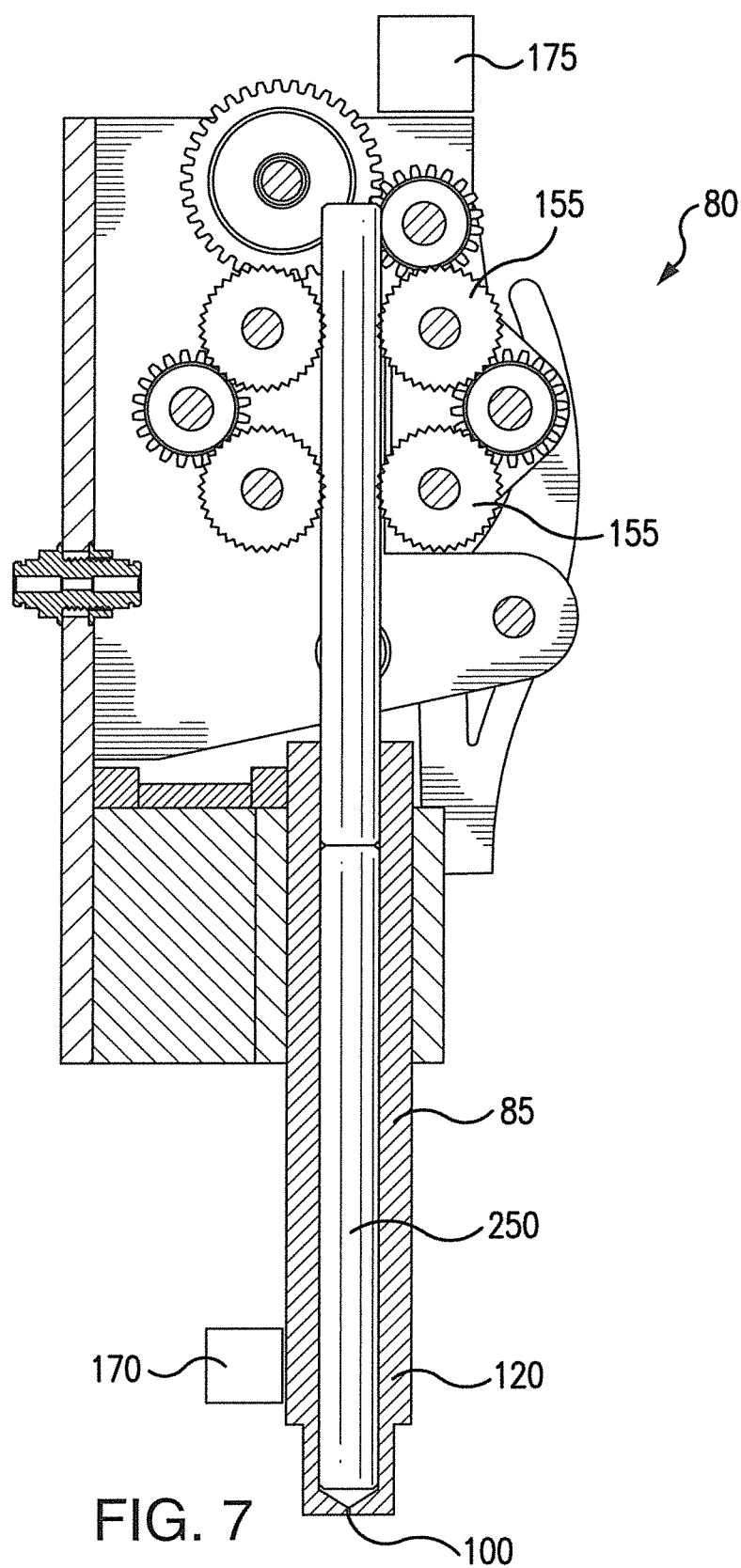
FIG. 7 is a cross-sectional side view of the electromagnetic nozzle shown in FIG. 5.

FIGS. 5-7 show various views of a printing nozzle utilizing a series of gears 155. As shown in FIGS. 5 and 6, the nozzle 80 may include a set of gears 155 that contact a filament 260 (or slugs 250) of working material as it passes through the nozzle 80. A stepper motor 165 controls a displacement of the working material through the nozzle 80. A temperature sensor 170, shown schematically in FIGS. 5-7, such as a thermocouple, is positioned within the nozzle 80 to determine a temperature of the working material within the nozzle 80. A load cell 175, also shown schematically in FIGS. 5-7, is preferably additionally positioned within the nozzle 80 to determine a pressure of the working material against the tip 100 of the nozzle 80.

In a preferred method of operation, a temperature of the working material in proximity to the tip 100 is sensed and the working material is accordingly moved through the material guide 85 based upon the sensed temperature. Preferably, a load of the working material is also sensed and the working material is moved through the material guide 85 based upon the sensed load. In operation, a fixed pressure on the working material is maintained until the working material has melted at which point the working material is moved through the material guide 85 at a fixed displacement.

The temperature sensor 170 or thermocouple placement is important for good control of the nozzle temperature. For designs utilizing a single heat source, either electromagnetic or resistive, the thermocouple is preferably embedded in the nozzle near the tip as close to the melt chamber as possible. According to one preferred embodiment of this invention, a channel is cut into the nozzle deep enough to ensure good thermal transfer but not so deep that it penetrates the melt chamber. The thermocouple is then placed in this channel and a ceramic adhesive is applied in order to secure it. This allows for a faster response to thermal changes. For designs utilizing an electromagnetic preheater and a resistively heated melt chamber the thermocouple is preferably embedded in the thermal mass surrounding the melt chamber. This design relies on the thermal mass to maintain the melt chamber at the desired temperature. Because this thermal mass is so much larger than the material being melted its temperature will be very close to that of the molten material. This means that the control of the temperature of the thermal mass is more crucial thus the thermocouple is embedded in it instead of the nozzle.

The load cell is crucial for controlling the system when a plunger is used to feed material. The electromagnetic forces on the material generated by the induction coil would cause it to levitate out of the hot zone if it isn't held in place. During the initial heatup and melting of the material the extruder is kept in force control mode. In this mode a constant force is applied to the material in order to keep it within the hot zone. This is done by constantly moving the plunger either down to increase the force or up to decrease it. When the material is melted and extrusion starts the extruder is switched into velocity control mode. In this mode the plunger is kept moving at a constant velocity in order to keep the material feeding into the melt chamber and out of the nozzle at a consistent rate. This is done by adjusting the pulse frequency of the control signal to either increase or decrease the motor velocity. If the system detects a spike in force that exceeds a set limit it reverts back to force control mode.

FIGS. 8 and 9 show two embodiments of the invention including rollers and alternative heating arrangements. FIG. 8 shows two or more rollers 150 driving the working material, either slugs or a filament, forward through the tip 100 of the nozzle 80. An electromagnetic coil 120 is positioned around the material guide 85. In addition, a susceptor 130 is positioned around the material guide 85 to further facilitate heating and heat control. The susceptor 130 may be positioned outside of the material guide 85, as shown in FIG. 8, or alternatively may be embedded within the material guide 85, or still further may be positioned inside of the material guide 85.

FIG. 9 shows an arrangement of the nozzle 80 including two or more rollers 150 driving the working material forward through the tip 100 of the nozzle 80. A resistive heater 140 is positioned around the material guide 85 for heating the working material. The resistive heater 140 may be positioned on the outside of the material guide 85 as shown in FIG. 9, or alternatively may be embedded within the material guide 85, or still further may be positioned inside of the material guide 85.

According to preferred embodiments of the invention shown in FIGS. 10-23, a printing nozzle 80 may comprise an advancement mechanism positioned behind at least a portion of the supply of working material for advancing the working material forward. As previously described herein a material guide 85 and electromagnetic heating element 110 may be used in these embodiments.

Figure 10:
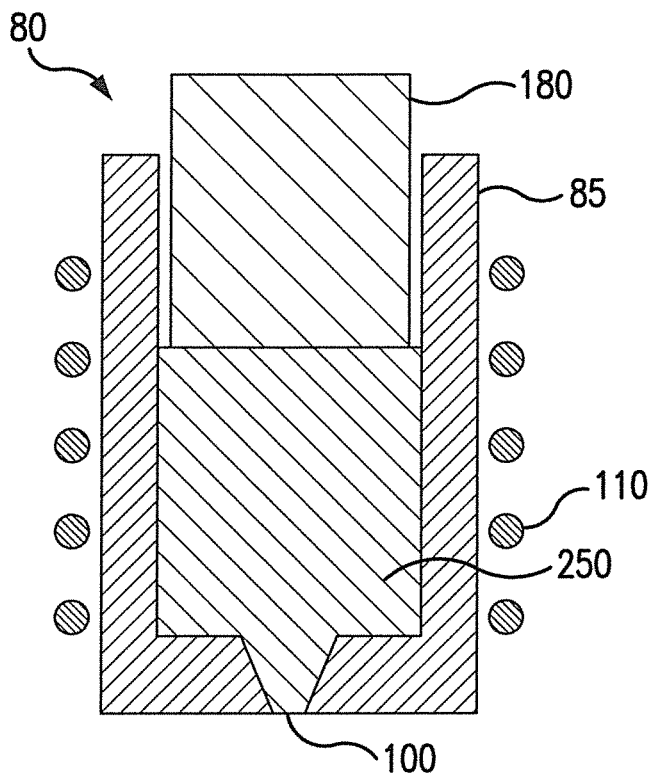
FIG. 10 is a schematic of an electromagnetic nozzle and an induction coil according to one embodiment of this invention.
Figure 11:
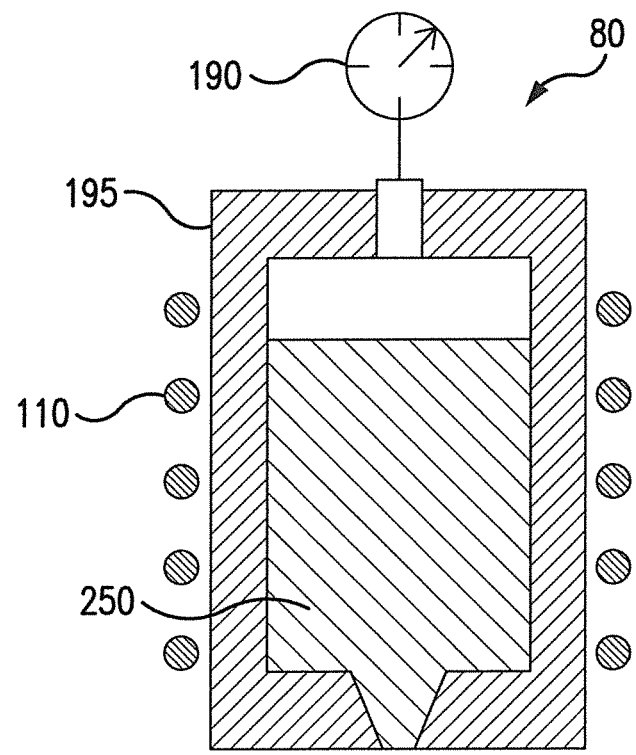
FIG. 11 is a schematic of an electromagnetic nozzle and an induction coil according to one embodiment of this invention.
Figure 12:
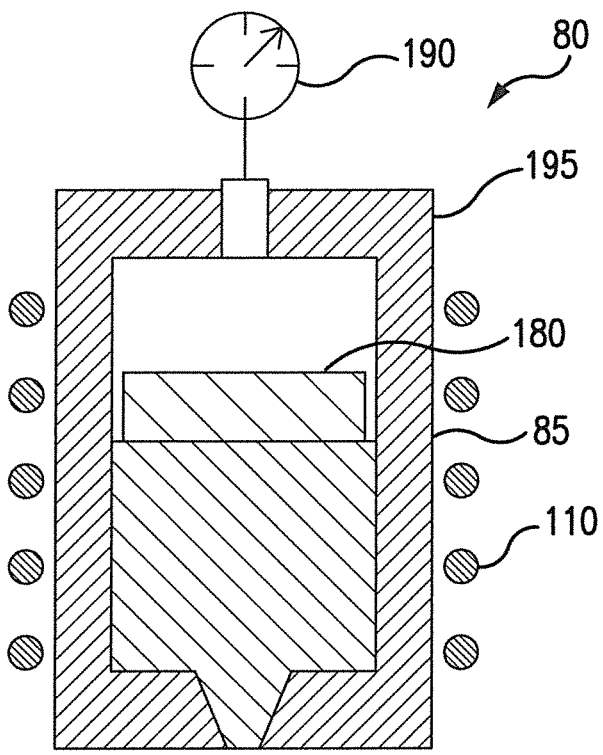
FIG. 12 is a schematic of an electromagnetic nozzle and an induction coil according to one embodiment of this invention.
Figure 13:
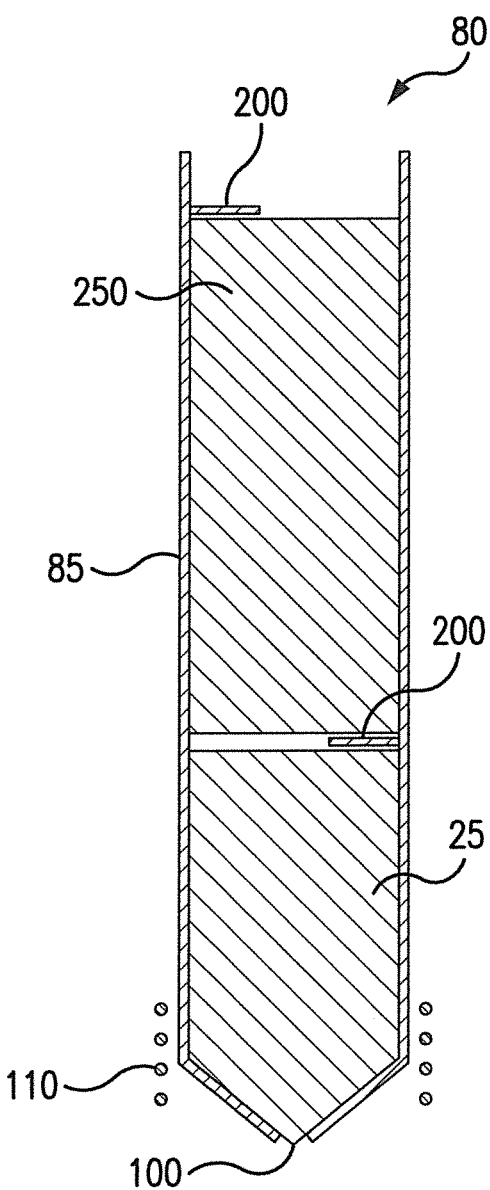
FIG. 13 is a schematic of an electromagnetic nozzle and an induction coil according to one embodiment of this invention.
Figure 22:
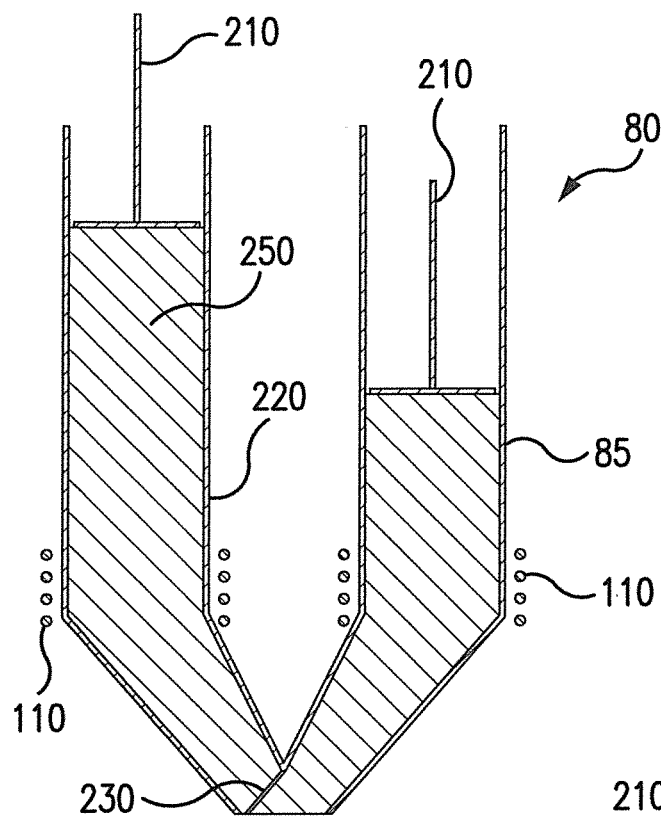
FIG. 22 is a schematic of an electromagnetic nozzle having a primary and secondary material guide according to one embodiment of this invention.
Figure 23:
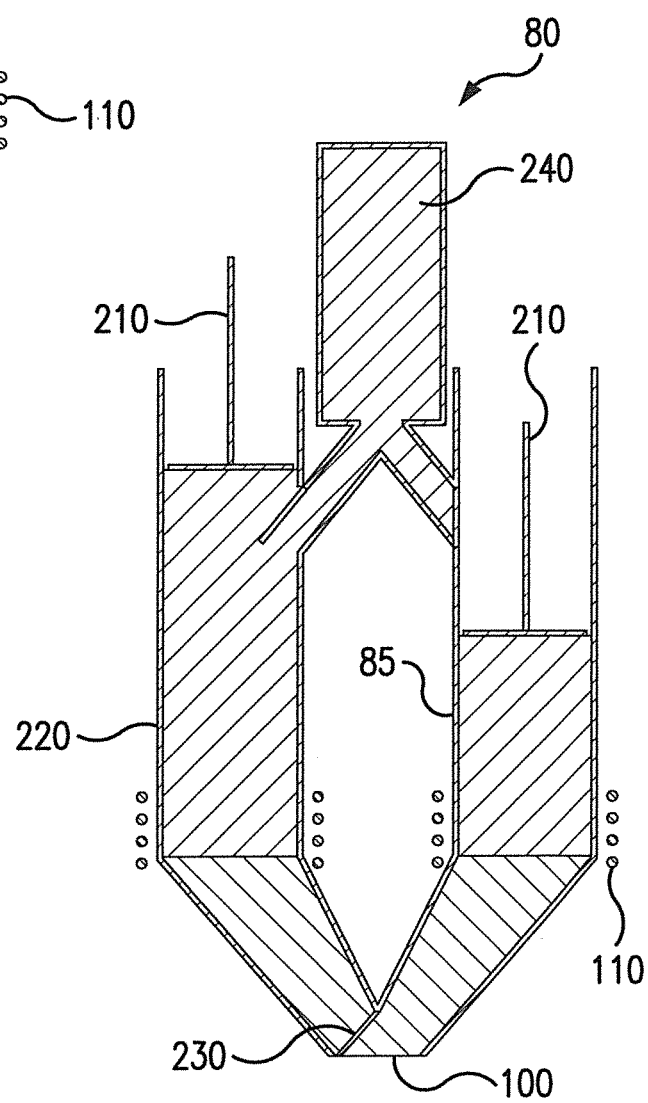
FIG. 23 is a schematic of an electromagnetic nozzle having a primary and secondary material guide according to one embodiment of this invention.

The advancement mechanism may comprise a piston 180, as shown in FIGS. 10, 12 and 14-19, a pressure regulation system 190, as shown in FIGS. 11 and 12, a pusher 200, as shown in FIG. 13, and/or a plunger 210, as shown in FIGS. 22 and 23.

FIG. 10 shows one embodiment of the invention having a material guide 85 and an internal piston 180. The piston 180 is shown schematically but is preferably tightly gapped within the material guide 85 to force slugs 250 of working material through the tip 100 of the nozzle 80. As shown, an induction coil 110 is preferably positioned around the material guide to heat the working material into a molten state and out of the tip 100.

FIG. 11 shows a similar arrangement as FIG. 10 but replaces the piston 180 with a pressure regulation system 190. The pressure regulation system 190 preferably includes a sealed cylinder 195 and a pressure source, such as a pneumatic pump (not shown) for generating pressure to force the working material through the tip 100. According to this preferred embodiment, the working material within the sealed cylinder 195 is heated to a molten state and then pressure is applied to force the material out of the nozzle 100 and onto the workpiece.

FIG. 12 shows one preferred embodiment similar to FIG. 11 but further including an internal piston 180 positioned within the sealed cylinder 195 to force the working material through the tip 100. A pressure regulation system 190 thereby builds pressure within the sealed cylinder 195 to force the piston 180 into a melting or molten working material and out of the tip 100. A pressurized system such as shown in FIGS. 11 and 12 typically requires stoppage and depressurization in order to load additional material into the sealed cylinder 195.

FIG. 13 shows one preferred embodiment of the invention including a material guide 85 and two or more retractable pushers 200 for advancing slugs 250 of material. The retractable pushers 200 are preferably positioned between slugs 250 of working material and advance the slugs 250 toward and through the tip 100 as the working material is melted by the induction coil 110.

Figure 14:
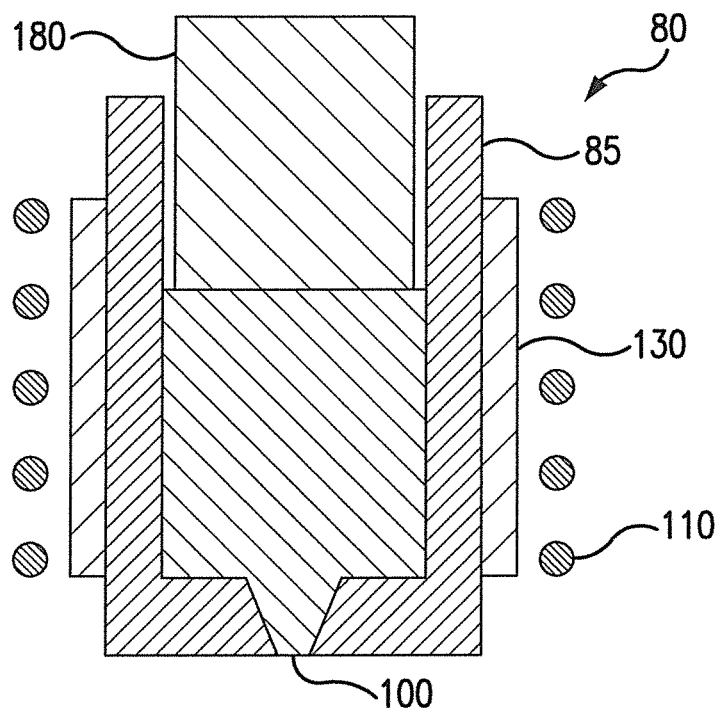
FIG. 14 is a schematic of an electromagnetic nozzle, an induction coil and a susceptor according to one embodiment of this invention.
Figure 15:
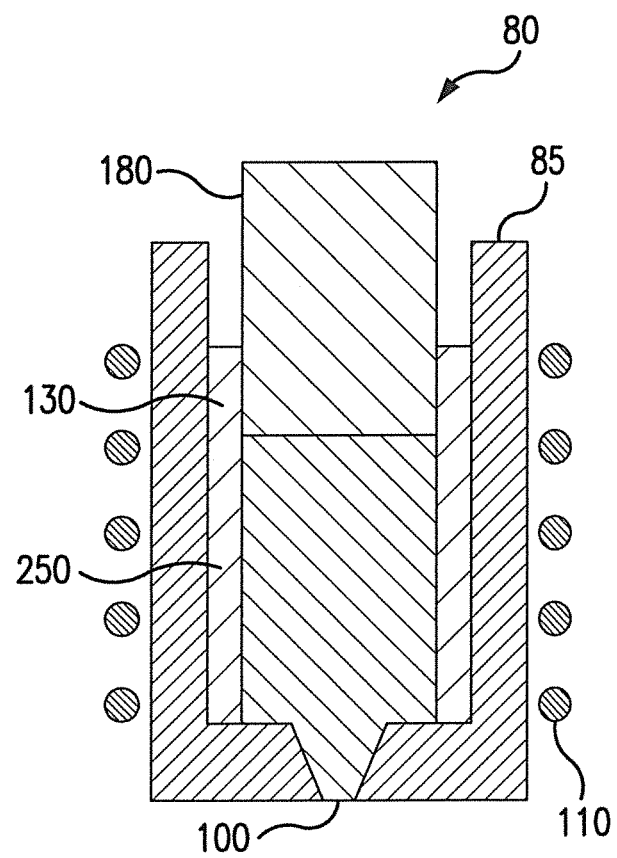
FIG. 15 is a schematic of an electromagnetic nozzle, an induction coil and a susceptor according to one embodiment of this invention.
Figure 16:
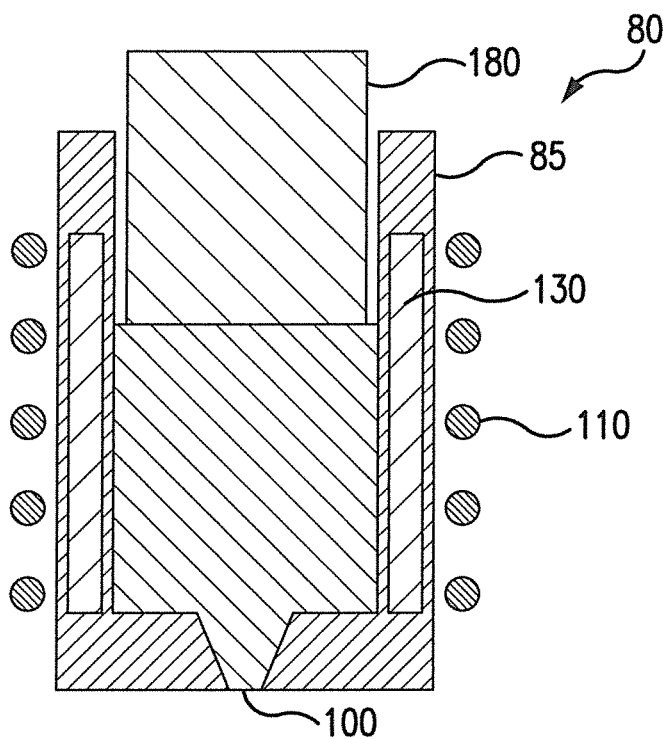
FIG. 16 is a schematic of an electromagnetic nozzle, an induction coil and a susceptor according to one embodiment of this invention.

FIGS. 14-16 shown preferred embodiments of the invention having a susceptor 130 positioned between the material guide 85 and the electromagnetic heating element 110, namely an induction coil. The susceptor 130 may be heated by the induction coil and then used to heat the working material. This embodiment is useful for heating materials that cannot be coupled directly using induction heating. The susceptor 130 instead provides the direct heating to the working material. The susceptor 130 may be positioned on an outside surface of the material guide 85, such as shown in FIG. 14 or an interior surface of the material guide 85 in direct contact with the working material, such as shown in FIG. 15. Alternatively, the susceptor 130 may be embedded within the material guide 85, as shown in FIG. 16.

Figure 17:
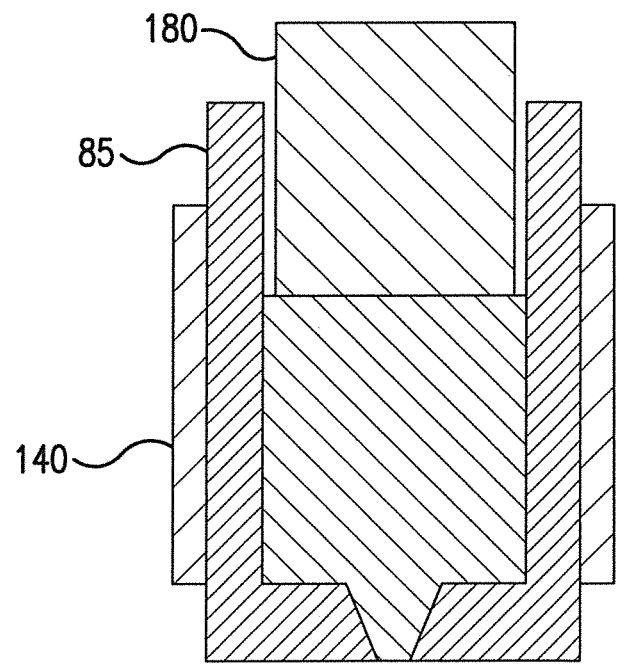
FIG. 17 is a schematic of an electromagnetic nozzle and a resistive heater according to one embodiment of this invention.

According to one preferred embodiment of the invention, the electromagnetic heating element 110 may comprise a resistive heater 140 positioned on an outside surface of the material guide 85, such as shown in FIG. 17, or on an interior surface of the material guide 85 in direct contact with the working material, such as shown in FIG. 18. Alternatively, and as shown in FIG. 19, the resistive heater 140 may be embedded within the material guide 85.

Figure 20:
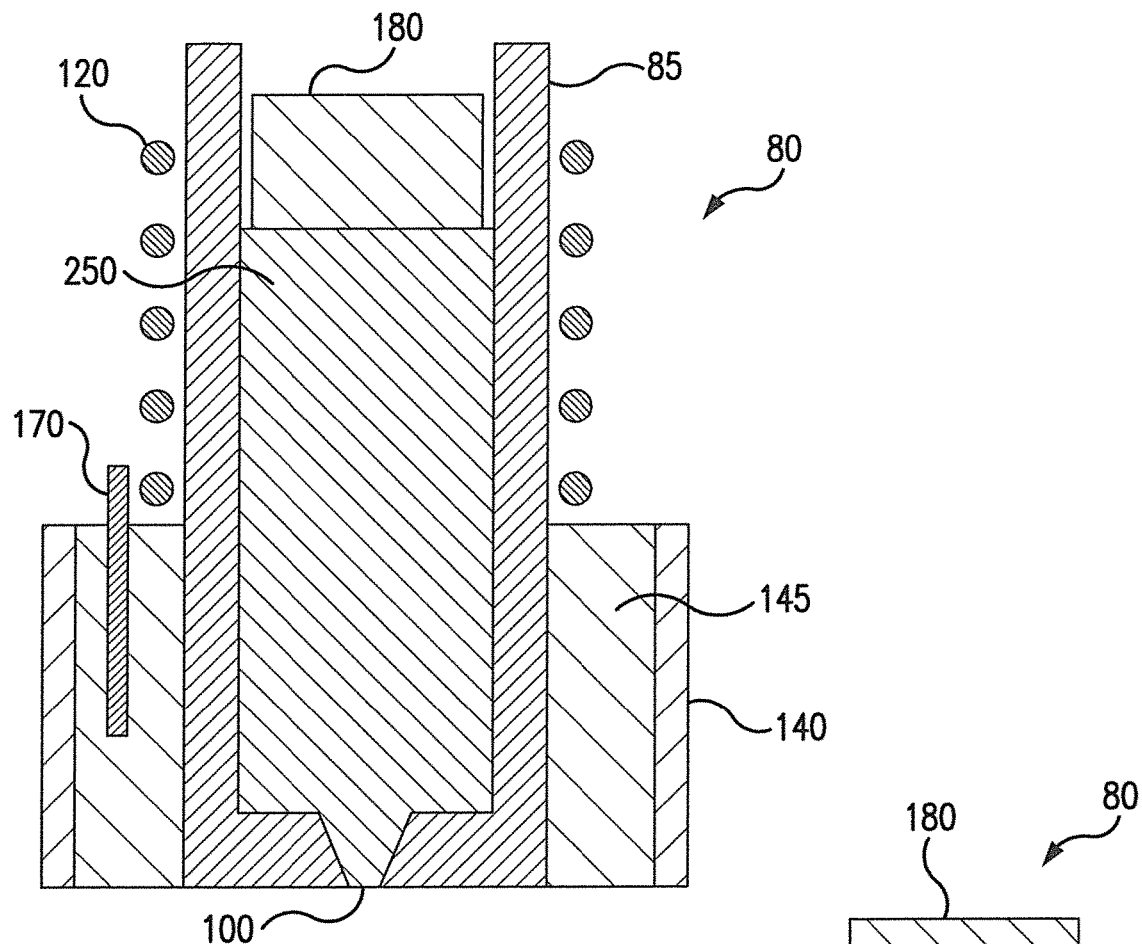
FIG. 20 is a schematic of an electromagnetic nozzle, an induction coil and an added thermal mass according to one embodiment of this invention.

FIG. 20 shows one preferred embodiment of the nozzle 80 utilizing a piston 180 in addition to an electromagnetic coil 120 positioned around a material guide 85. The embodiment further includes a resistive heater 140 surrounding a portion of the material guide 85 below the coil 120 and an intermediate thermal mass 145 positioned between the resistive heater 140 and the material guide 85. A temperature sensor 170, such as a thermocouple, may be positioned within the thermal mass to accurately obtain temperature feedback within the nozzle 80. Although FIG. 20 is shown utilizing a piston 180, rollers 150, gears 155, pushers 200 and/or plungers 210 may be alternatively utilized in connection with a thermal mass 145 surrounding a material guide 85 as shown.

Figure 21:
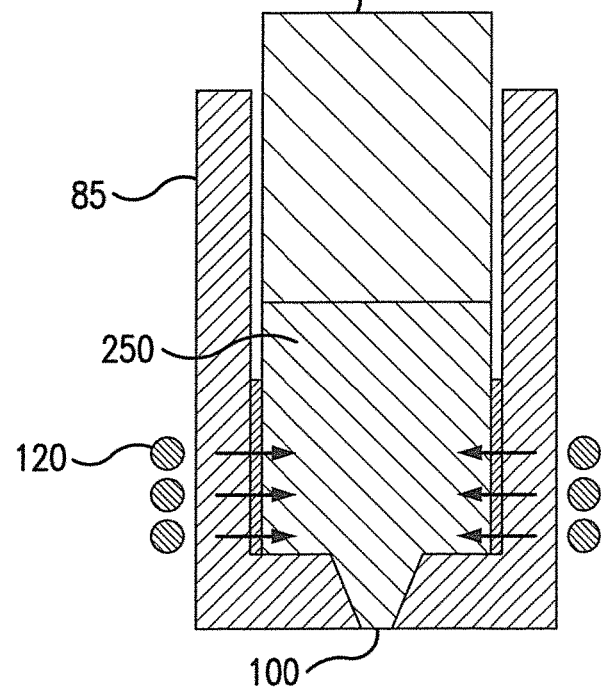
FIG. 21 is a schematic of an electromagnetic nozzle and an induction coil demonstrating material and heat movement according to one embodiment of this invention.

FIG. 21 shows a preferred embodiment of the invention similar to that shown in FIG. 10. In a preferred arrangement, a small gap 215 is positioned between the piston 180 and the material guide 85. In this manner, a seal is created by the stratification between molten working material and resolidified material residing in the gap 215 as the electromagnetic coil 120 melts working material closest to the tip 100 of the nozzle 80. The gap 215 positioned between the piston 180 and an interior of the material guide 85 is preferably of sufficient size to permit solidifying working material to create a seal between the piston 180 and the material guide 85.

According to one embodiment of the invention, the printing nozzle 80 may further include a secondary material guide 220 positioned in parallel with the material guide 85. In such an embodiment, the material guide 85 is referenced as the "primary" material guide 85 and, together with the secondary material guide 220, operate to maintain a flow of working material to the nozzle 80. FIGS. 22 and 23 show two embodiments of a nozzle 80 having a primary material guide 85 and a secondary material guide 220. A moveable gate 230 may be positioned between the secondary material guide 220 and the primary material guide 85. The gate 230 may be selectable to close off at least one of the secondary material guide 220 and the primary material guide 85 to permit flow of working material or blending of two or more working materials or mixing of the working material with an additive or dopant or similar process for maintaining a supply of a desired working material. The gate 230 may be selectable to simultaneously open the secondary material guide 220 and close the primary material guide 85 to provide precise metering or control of the flow of working material and/or additives.

FIGS. 22 and 23 additionally show preferred embodiments of the nozzle comprising a material guide 85 having an internal advancement mechanism that comprises at least two plungers 210, one plunger positioned relative to the primary material guide 85 and a second plunger positioned relative to the secondary material guide 220. The plungers 210 may comprise a less rigid engagement than a piston 180 and may be used to urge the working material forward while providing additional volume for new supplies, such as slugs 250, of working material to be inserted.

As shown in the embodiments of FIGS. 22 and 23, the electromagnetic heaters 110 may be positioned above the tip 100 of the nozzle at each of the primary material guide 85 and the secondary material guide 220 such that the working material transitions from a solid state to a molten state as it moves toward the gate 230 and the tip 100 of the nozzle 80.

According to one preferred embodiment, shown in FIG. 23, a hopper 240 may be positioned relative to the material guide 85 and/or the secondary material guide 220 to provide a generally continuous supply of working material, particularly a pelletized or granular form of working material, such as a raw or filled thermoplastic. Such arrangement may further include a selectable feed system for selectably providing build material to the primary material guide 85 and the secondary material guide 220. Such a selectable feed system may comprise a gate 230, as discussed above.

Figure 24:
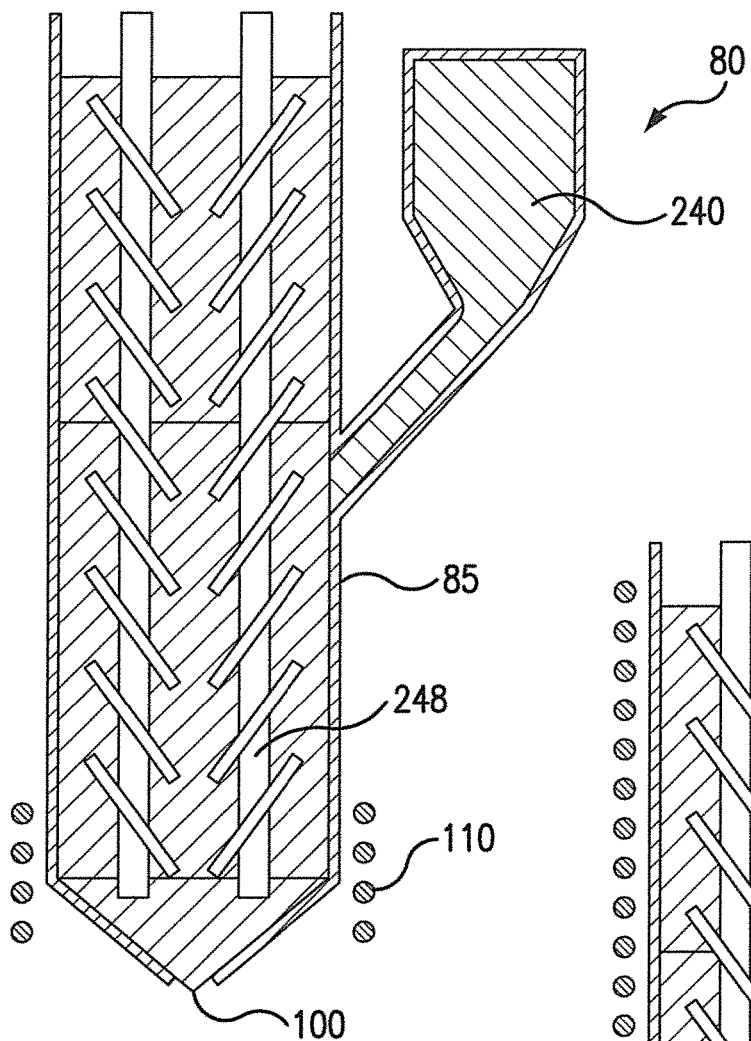
FIG. 24 is a schematic of an electromagnetic nozzle having a twin screw extruder according to one embodiment of this invention.
Figure 25:
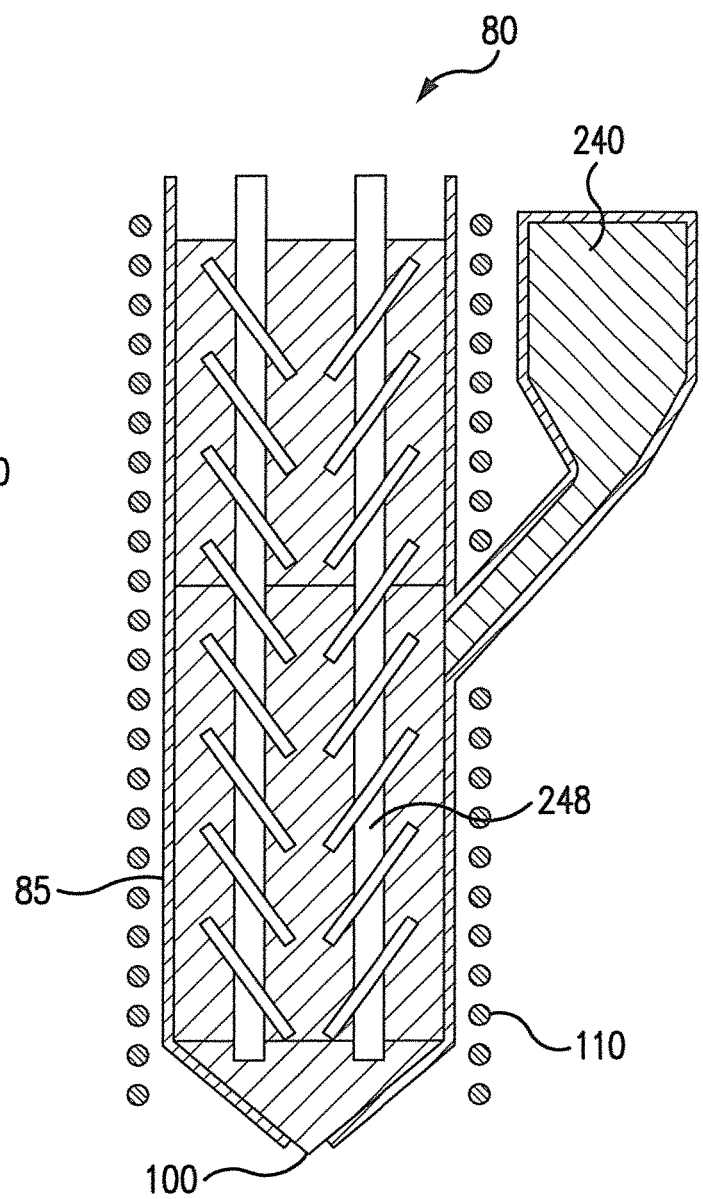
FIG. 25 is a schematic of an electromagnetic nozzle having a twin screw extruder according to one embodiment of this invention.
Figure 26:
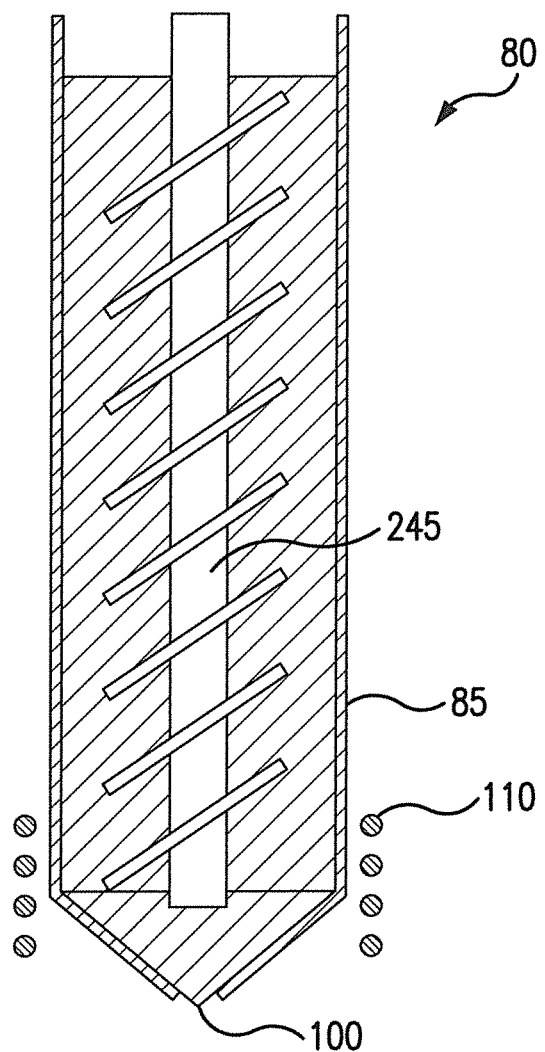
FIG. 26 is a schematic of an electromagnetic nozzle and an extruder according to one embodiment of this invention.

According to embodiments of the nozzles shown in FIGS. 24-26, an additive manufacturing printing nozzle may include a single screw extruder 245 for advancing the working material forward. A basic arrangement of such an embodiment is shown in FIG. 26 wherein a screw is positioned within a material guide 85 for permitting a desired flow of the working material. As the working material moves forward through the extruder, a combination of heat and pressure urges the working material into a molten state and out of the material guide 85. A tip 100 is positioned at an end of the material guide 85 for depositing the working material in an appropriate position in space; and an electromagnetic heating element 110, such as an induction coil, is positioned with respect to the material guide 85.

FIGS. 24 and 25 show embodiments having a twin screw extruder 248 wherein two screws are positioned within the material guide, each having opposing pitches. Such a twin screw extruder 248 may further enhance mixing, heating, melting and depositing of the working material from the tip 100 of the material guide 85.

The embodiments shown in FIGS. 24-26 using extruders 245, 248 may further include a secondary material guide 220 and/or a hopper 240. The hopper 240 may feed working material to the material guide or, as shown in FIGS. 24 and 25 may include a second material, such as a filler material, that is then fed to the extruder. The filler material may include carbon fiber or fiberglass reinforcement for creating an in-situ mixed composite material. In such a mixed environment as described, the extruders 245, 248 may include different temperature zones as the working material and the filler material are mixed.

As shown in these embodiments, the printing nozzle 80 may include the electromagnetic heating element 110, such as an induction coil, positioned around only the tip 100 of the material guide 85, as shown in FIG. 24. Alternatively, electromagnetic heating element 110 may be positioned around the entire material guide 85, as shown in FIG. 25.

A method of additive manufacturing according to a preferred embodiment of this invention may include providing a supply of a working material through a single material guide 85, a secondary material guide 220 and/or a hopper 240. A single or twin screw extruder 245, 248 may be provided within the material guide 85 for advancing the working material forward and, following heating with an electromagnetic heating element, may be provided through a tip 100 of the material guide 85 in a molten state for depositing in an appropriate position in space and/or on a workpiece.

Figure 27:
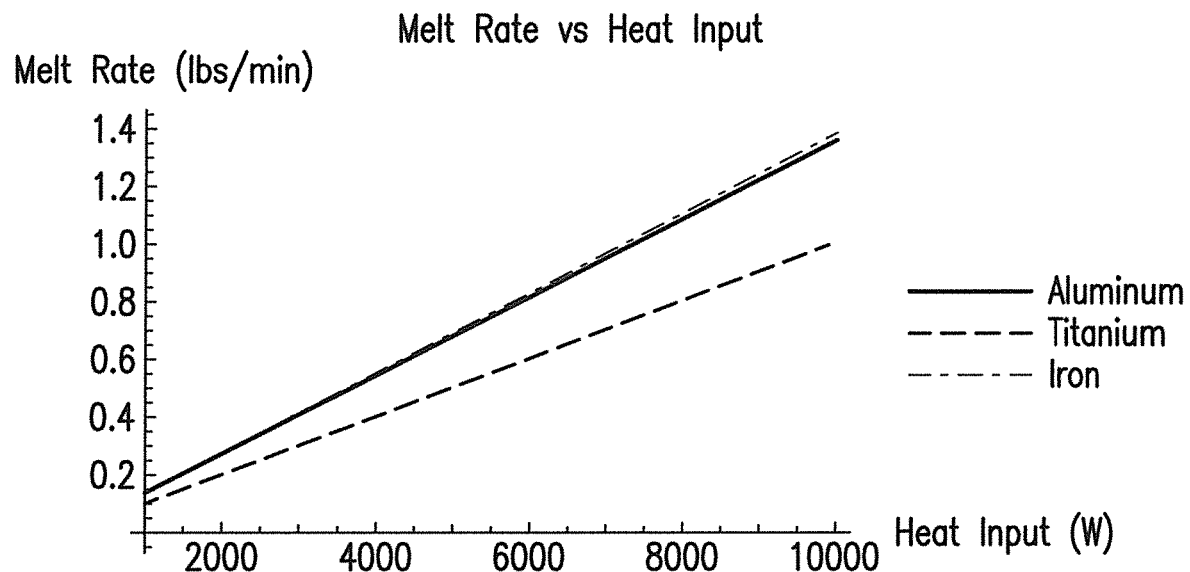
FIG. 27 is a graph showing melt rate vs. heat input of various materials.
Figure 28:
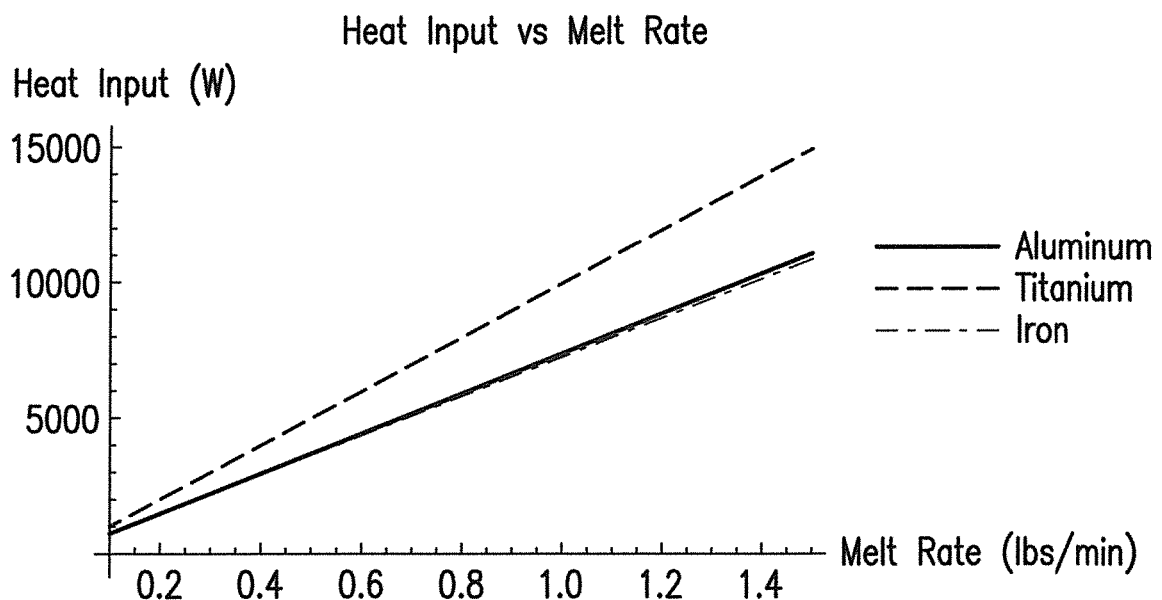
FIG. 28 is a graph showing heat input vs. melt rate of various materials.
Figure 29:
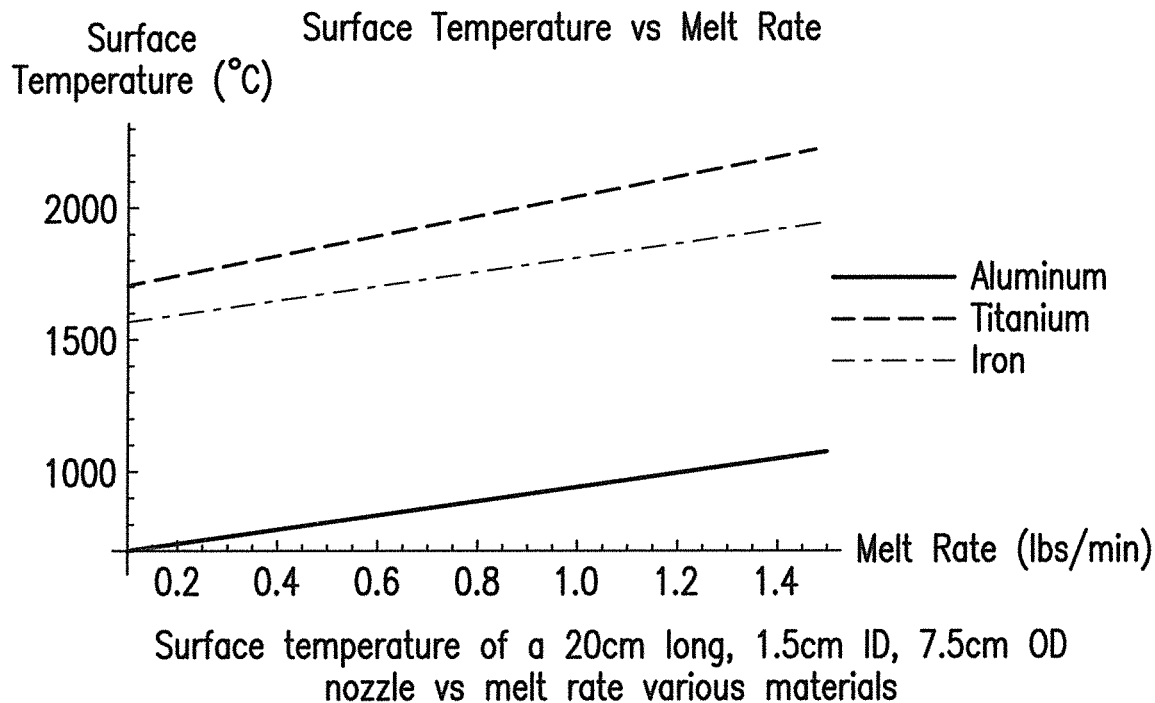
FIG. 29 is a graph showing surface temperature vs. melt rate of various materials.
Figure 30:
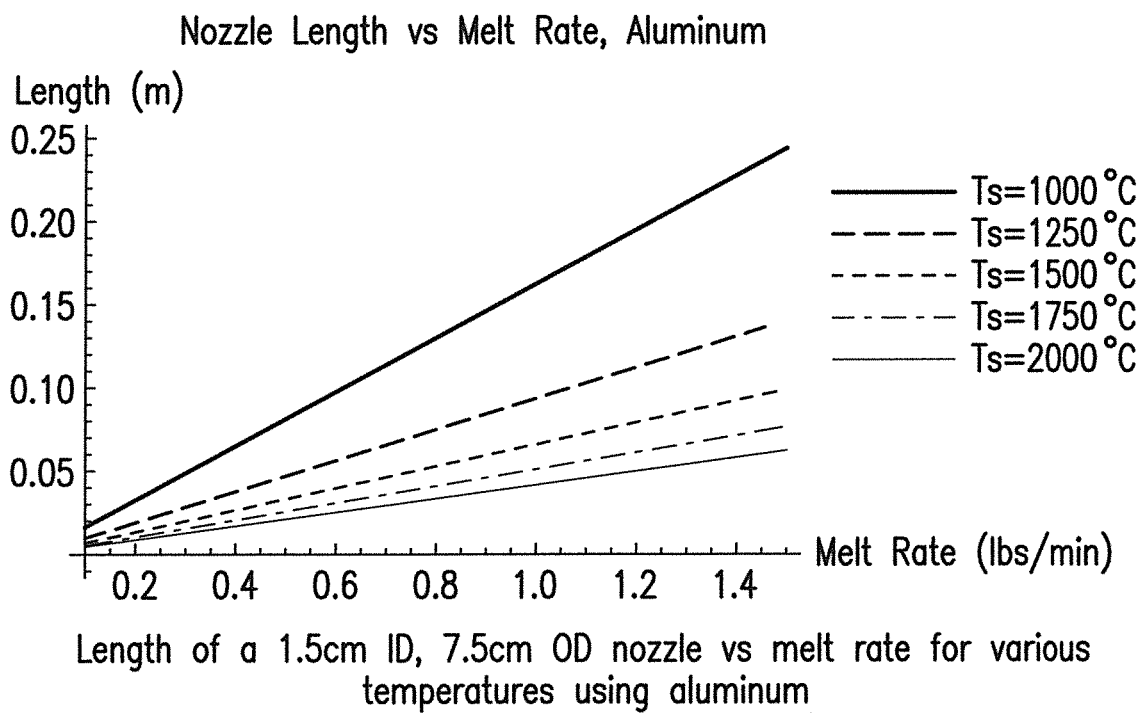
FIG. 30 is a graph showing nozzle length vs. melt rate of aluminum.

The graphs shown at FIGS. 27-30 variously illustrate the agility of a nozzle and related system utilizing an electromagnetic heating element 110 as described herein. Collectively, the following graphs demonstrate the efficiency of electromagnetic heating for various working materials contemplated for the subject invention. This is contrary to traditional resistive heating wherein heat from the outside of the nozzle must be driven into the material thereby expending unnecessary time and energy. Electromagnetic heating as described herein is energy dense thereby enabling high energy transfer direct to the working materials. This is helpful in additive manufacturing where repeated start-stops are often required during a build. FIG. 27 is a graph showing melt rate vs. heat input of various working materials, namely, aluminum, titanium and iron. FIG. 28 is a graph showing heat input vs. melt rate of the same working materials. FIG. 29 is a graph showing surface temperature vs. melt rate of the same working material. Finally, FIG. 30 is a graph showing nozzle length vs. melt rate of a representative working material, aluminum.

The efficiency of the subject system permits low voltage heater arrangements. Specifically, the printing nozzles 80 as described herein preferably utilize an electromagnetic heating coil voltage of less than 40 volts. Such low voltage supply enhanced safety and usability.

Figure 31:
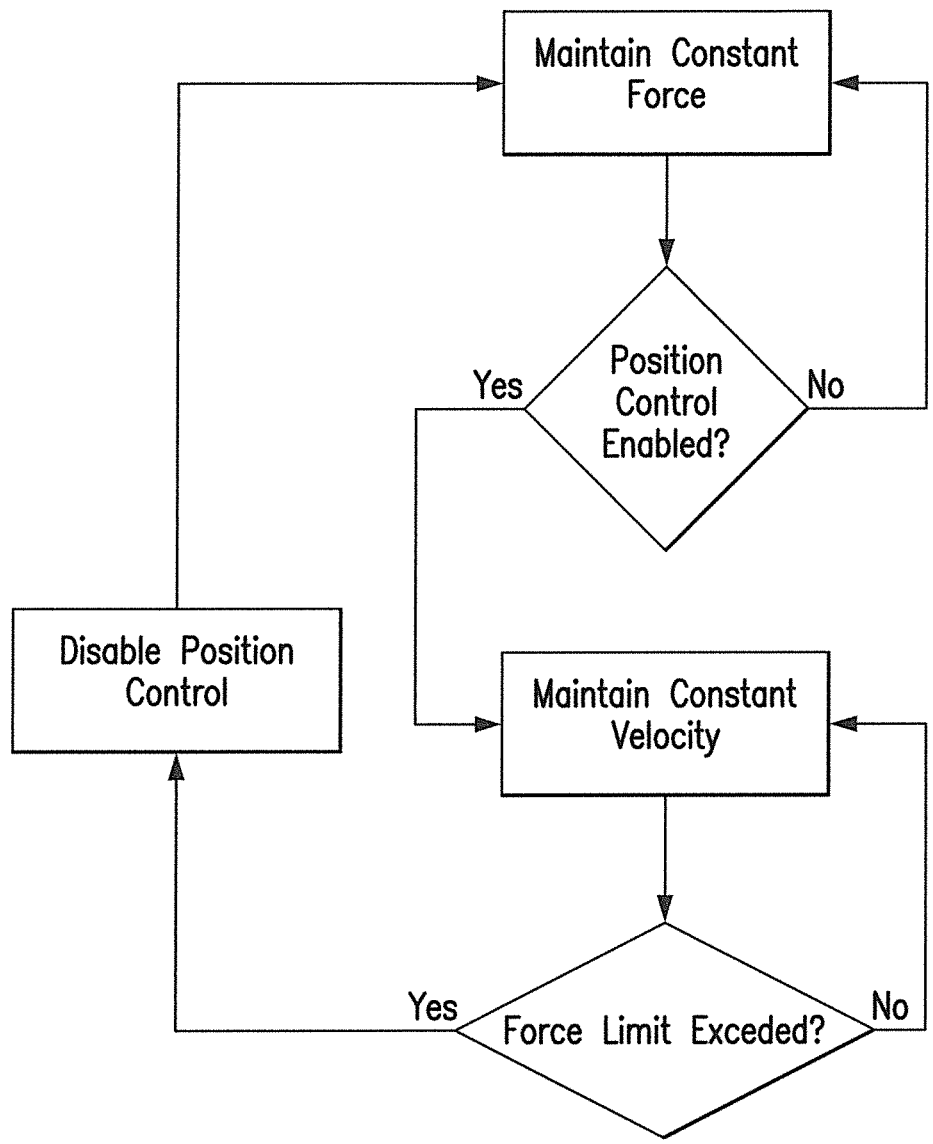
FIG. 31 shows a flow chart of one preferred operation of an electromagnetic nozzle.
Figure 32:
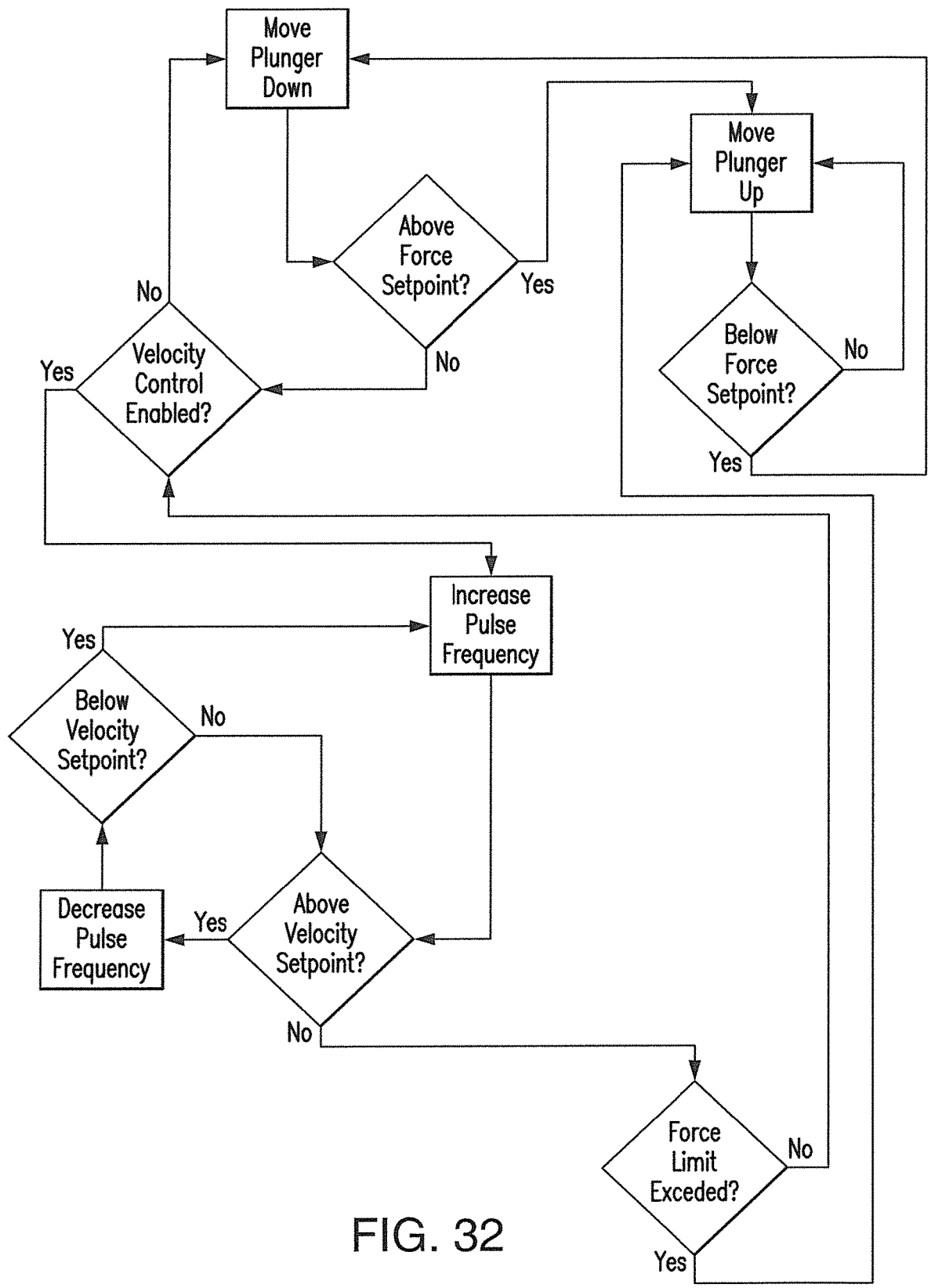
FIG. 32 shows a flow chart of one preferred operation of an electromagnetic nozzle.

FIGS. 31 and 32 show flow charts of two preferred operations of the nozzle 80 according to embodiments of the invention. In particular, the interrelationship between the stepper motor 165 or drive system of the nozzle 80, the temperature sensor 170 and the load cell 175 are shown and described. For instance, FIG. 31 demonstrates that a constant velocity is maintained on the working material until a force limit is exceeded at which time a position control is disabled and a constant force is maintained. FIG. 32 further incorporates movement of a piston 180 or plunger 210 relative to velocity control and force limits of the working material.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A printing nozzle for use in deposition for additive manufacturing comprising:
   a plurality of rollers configured to be in lateral contact with outside edges of an electromagnetically susceptible working material for advancing the working material forward during operation, wherein the plurality of rollers is connected to a stepper motor by a set of gears;
   a material guide for permitting a desired flow of the working material, the material guide comprising a plurality of channels configured to permit direct contact between the working material and the rollers during operation;
   a tip positioned at an end of the material guide for depositing the working material in an appropriate position in space; and
   an electromagnetic heating element positioned with respect to the material guide.

2. The printing nozzle of claim 1 wherein the electromagnetic heating element is positioned around the tip.

3. The printing nozzle of claim 1 wherein the electromagnetic heating element is position around the material guide.

4. The printing nozzle of claim 1 wherein the rollers comprise knurled rollers.

5. The printing nozzle of claim 1 wherein the rollers are positioned at multiple places along the material guide.

6. The printing nozzle of claim 1 wherein one or more of the plurality of rollers are fixed and one or more of the plurality of rollers are moveable.

7. The printing nozzle of claim 1 wherein the moveable rollers are biased toward the fixed rollers.

8. The printing nozzle of claim 1 further comprising a load cell positioned with respect to the material guide downstream of the plurality of rollers for sensing a pressure applied to the working material.

9. The printing nozzle of claim 1 further comprising a temperature sensor positioned downstream of the electromagnetic heating element and in proximity to the tip, wherein the temperature sensor is disposed in a channel cut in the material guide.

10. The printing nozzle of claim 1 wherein the plurality of channels comprise a plurality of discrete channels longitudinally spaced apart along a length of the material guide.

11. The printing nozzle of claim 1 wherein the stepper motor is on a first side of the material guide and the plurality of rollers, and the set of gears is on a second side of the material guide and the plurality of rollers, the second side opposite the first side.

12. The printing nozzle of claim 11 further comprising a support structure connected to and extending about the material guide, wherein the support structure supports the stepper motor on the first side and the set of gears on the second side.

13. A method for additive manufacturing comprising:
providing a supply of slugs of a metal working material;
advancing the working material forward with a plurality of rollers in direct lateral with outside edges of the working material through channels in a material guide;
advancing the plurality of rollers by a stepper motor in combination with each of the plurality of rollers through a set of gears;
heating the working material in the material guide with an electromagnetic heating element positioned around the material guide; and
depositing molten working material through a tip positioned at an end of the material guide in an appropriate position in space.

14. The method of claim 13 further comprising:
sensing a temperature of the working material in proximity to the tip; and
moving the working material through the material guide based upon the temperature.

15. The method of claim 13 further comprising:
sensing a load of the working material; and
moving the working material through the material guide based upon the load.

16. The method of claim 13 further comprising:
maintaining a fixed pressure on the working material;
sensing that the working material has melted; and
moving the working material through the material guide at a fixed displacement once the working material has melted.

17. The method of claim 13 wherein the advancing the working material forward with a plurality of rollers in direct lateral contact with outside edges of the working material comprises the rollers directly contacting the outside edges of the working material through discrete channels longitudinally spaced apart along a length of the material guide.

* * * * *